United States Patent

Wiggerman

[11] Patent Number: 6,139,170
[45] Date of Patent: Oct. 31, 2000

[54] LIGHT AND HORN COMBINATION FOR MARINE USE

[75] Inventor: Ronald E. Wiggerman, McHenry, Ill.

[73] Assignee: Aqua Signal Corporation, Cary, Ill.

[21] Appl. No.: 09/188,274

[22] Filed: Nov. 9, 1998

[51] Int. Cl.[7] ............... F21V 1/00; F21V 33/00; B60Q 1/00; H04M 1/22; G08B 23/00
[52] U.S. Cl. ............... 362/477; 362/86; 362/253; 340/984
[58] Field of Search ............... 362/477, 86, 253, 362/383, 473, 446; 340/984, 326, 332, 471, 472, 384.4

[56] References Cited

U.S. PATENT DOCUMENTS

| | | | |
|---|---|---|---|
| 945,311 | 1/1910 | Fendrich | 362/86 |
| 1,134,360 | 4/1915 | Walker | 362/86 |
| 1,185,740 | 6/1916 | Wales | 362/86 |
| 2,593,171 | 4/1952 | Morse | 362/477 |
| 2,850,621 | 9/1958 | Bateman et al. | 362/477 |
| 3,007,135 | 10/1961 | Marr | 340/984 |
| 3,478,837 | 11/1969 | Ross | 362/86 |
| 4,825,800 | 5/1989 | Kitchen | 116/4 |
| 5,099,220 | 3/1992 | Camarota | 340/984 |
| 5,132,659 | 7/1992 | Kuo | 340/326 |
| 5,703,335 | 12/1997 | Deutsch | 181/150 |

*Primary Examiner*—Sandra O'Shea
*Assistant Examiner*—Bryan P. Stanley
*Attorney, Agent, or Firm*—Gardner, Carton & Douglas

[57] ABSTRACT

A combination marine horn and bow light is provided. According to the invention, a single unit houses a bow light assembly affixed to a housing which contains a sound emitting portion of the horn. The bow light and sound emitting portion of the horn are preferably mounted on the top surface of a boat bow deck. The horn is installed below the bow deck surface. The entire unit is powered by a single electrical supply. Alternatively, separate bow light and horn units may be affixed to the deck or hull sidewalls. In this embodiment, each bow light would have a separate colored lens cover. In a further embodiment, for either deck or sidewall mounting, the light and horn combination, including the sound emitting and sound producing portions, are all mounted on the exterior of the vessel.

13 Claims, 3 Drawing Sheets

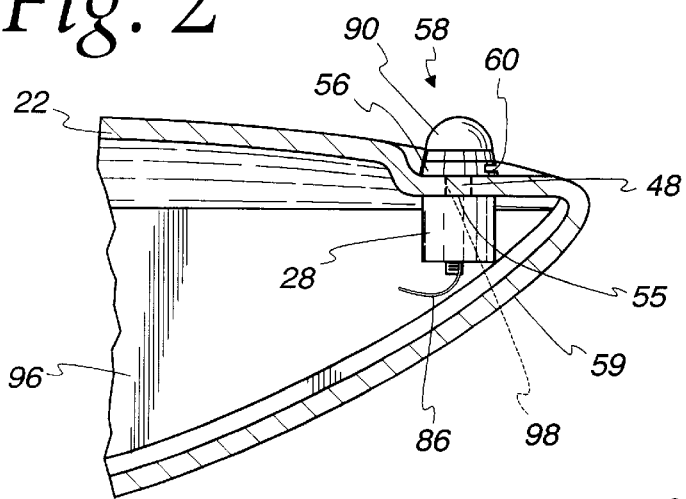
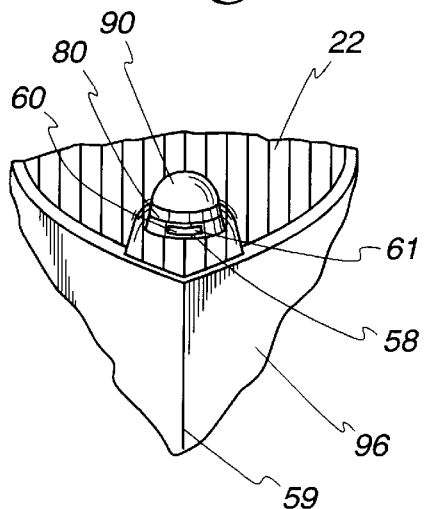
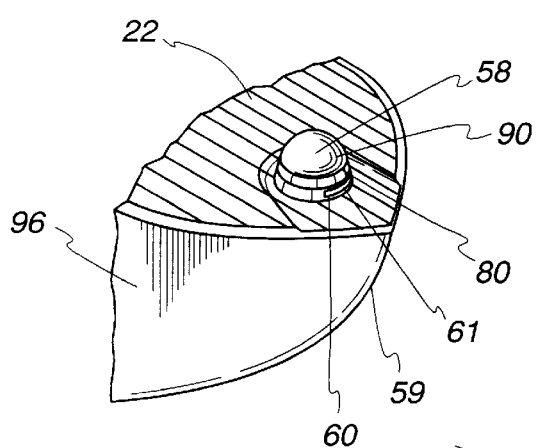
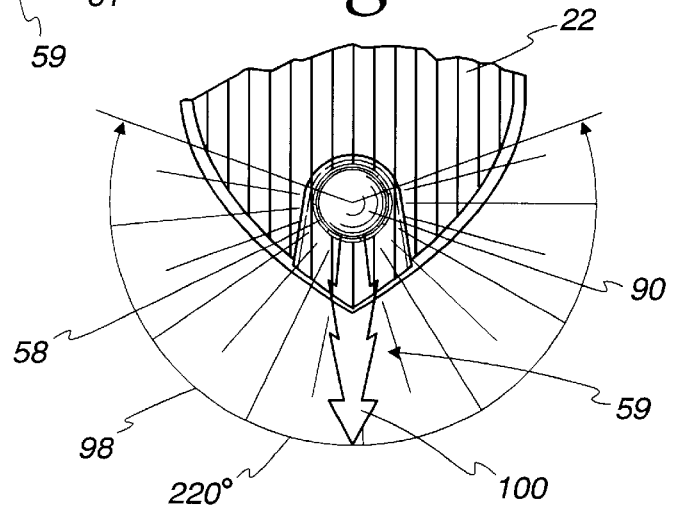

LIGHT AND HORN COMBINATION FOR MARINE USE

TECHNICAL FIELD

This invention relates generally to marine vessel safety devices and, more particularly, a combination bi color light (s) and horn combination for marine use. The combination may be mounted on a bow deck or, alternatively, on the sidewalls of the boat's hull near the bow.

BACKGROUND OF THE INVENTION AND PRIOR ART

To meet federal and international regulations, certain marine vessels must have bow lights and a horn. The bow lights serve not only as marine vessel identifiers, but also as waterway traffic control devices. A combination bi color light is mounted on the bow of the boat. The bow lights are red and green; by regulation, the red bow light is mounted on the port (left) side of the boat and the green light is mounted on the starboard (right) side of the boat. Bow lights may be mounted on the bow deck or the boat hull sidewall near the bow. If mounted on the deck, the bow light generally consists of a one-half red and one-half green toned lens cap over a single light source. If mounted on the hull sidewalls, there is a single starboard side green lens cap and a single port side red lens cap mounted over separate lighting sources found in the sidewalls.

As traffic control devices, bow lights signal to a boat's driver whether he has the right of way or must yield to another boat in a given circumstance. For instance, if boat number one and boat number two are approaching each other from an angle wherein the driver of boat number one views boat number two off of his starboard side, the driver of boat number one will view a red light on boat number two and the driver of boat number two will view a green light on boat number one. Thus, the driver of boat number one knows that since he has seen a red light, he must yield the right of way to boat number two. Conversely, the driver of boat number two, seeing a green light on boat number one, knows that he has the right of way in this situation.

Horns also serve as safety devices and are governed by federal and international standards. Various United States and International standards govern the size, decibels, operating Hertz range, octaves, etc., for horns. The present inventive device can be adapted to meet the various regulations based on boat location, size and other pertinent factors. For illustration purposes, however, the general guidelines set forth by the American Boat and Yacht Council, Inc. are instructive. Horns for vessels under 5 meters in length have no strict frequency requirements. However, a horn for these vessels should be capable of producing a continuous sound at the equivalent of 98 db at least 1 meter from the sound source for a period of 4 seconds at an ambient temperature of 77° F. plus or minus 10° F.

Horns for marine vessels from 5 meters in length up to 12 meters in length must be operable in a frequency of between 250 Hz and 1750 Hz. The horn should be capable of producing sound at the equivalent of 105 db at 1 meter from the sound source at an ambient temperature of 77° F. plus or minus 10° F. within an intermittent time cycle of 6 seconds on, 2 seconds off, 6 seconds on, 106 seconds off, for a period of 8 hours.

Horns for marine vessels from 12 meters to 20 meters in length must be operable in a frequency of 250 Hz and 700 Hz. The horn should be capable of producing sound at the equivalent of 120 db in at least one ⅓ octave band at 1 meter from the sound source, at an ambient temperature of 77° F. plus or minus 10° F. within an intermittent time cycle of 6 seconds on, 2 seconds off, 6 seconds on, 106 seconds off, for a period of 8 hours.

Historically, bow lights and horns have been separately installed. The bow lights are installed generally on the bow's deck surface and consist of a two toned lens (one-half green and one-half red) covering a single light source. Alternatively, bow lights can be mounted on the hull sidewalls near the bow using single tone lens (green on the starboard side and red on the port side) covering separate light sources. Horns mounted on the hull of a boat produce a sound which is emitted to the side versus the front of the boat or direction of travel. This can decrease the effectiveness of the horn. Horns are generally mounted on the bow deck surface near the boat windshield. They can, however, be mounted on the hull sidewall.

There are several drawbacks to the existing state of the art. First, modern boat building design leans toward very clean lines. Any interruption of those lines is undesirable. Thus, currently available horns and bow lights present limits to the design alternatives of boat designers.

A second drawback to the existing art is that horns are generally mounted above the deck surface. Thus, the working mechanism of a horn, while housed in a protective covering, is unnecessarily subjected to the elements. As a result, horns must be maintained, repaired and replaced more often than would be necessary if the working mechanism of the horn was installed below the deck surface and protected from the weather.

A third drawback to the existing art is that separate wiring systems are required for the horn and bow light. This increases the cost of both boat construction and maintenance over the cost of a single wiring system. Also, multiple wiring systems increase the likelihood of electrical shortage; this, of course, leads to, at best, malfunction, or possibly a fire or explosion.

A fourth drawback to the existing art is that by separately installing horns and bow lights, valuable deck surface is unnecessarily wasted.

There is need, therefore, for a marine horn and bow light combination which increases the aesthetic look of a boat, protects the horn's working mechanism from the environment, decreases the electrical wiring required to maintain both the horn and bow lights, increases usable deck space, and increases the safety and efficiency of the horn and bow lights. There is further need for a device offering these advantages while at the same time reducing the cost of installation, maintenance, and replacement of horns and bow lights.

OBJECTS OF THE INVENTION

It is an object of the present invention to provide a horn and bow light combination for marine use.

It is further object of the present invention to provide such a combination wherein the working elements of the horn are located below the deck surface and protected from the elements.

It is another object of the present invention to provide a horn and bow light combination for marine use in which the electrical wiring requirements are reduced when compared to the current state of the art.

It is yet another object of the present invention to provide a horn and bow light combination which can be mounted on the bow deck surface.

SUMMARY OF THE INVENTION

The invention provides a combination horn and bow light unit. According to the invention, a single unit housing both a marine horn and bow light is mounted to the bow deck. The unit comprises a horn assembly in which the horn is mounted below the bow deck surface, the horn assembly also having a resonating tube extending vertically from its uppermost side, the resonating tube extending through the bow deck surface. On the top side of the bow deck surface, the resonating tube makes a 90° turn to a horizontal position facing the front of the bow where it terminates in a port. The port can be of any shape, such as a circular opening or a fan opening. The only requirement is that the sound emanating from the horn meets the horn standards for a given marine vessel. The port opens to a mouth located in an adapter housing. The port is further covered with Gortex®-type material. Gortex® protects the horn from the elements yet does not have a material effect on the horn sound.

The resonating tube member is contained within the adapter housing which is designed to accept a bow light on its top portion. The housing includes means for attaching it through the bow deck and to the horn assembly. The bow light attaches to the top portion of the housing, with the electrical wiring for the bow light extending through a hole found in the housing, through the deck surface, and terminating below the bow deck surface. In the preferred embodiment, the bow light lens is two-toned, having a red port side and a green starboard side portion. The device, minus the bow light assembly, is designed to accept an existing bow light or a bow light manufactured in conjunction with the horn assembly.

In an alternative embodiment, the horn and bow light units may be installed into the hull sidewalls. In this embodiment, two units are installed, each unit having a separate green starboard lens and a red port lens for the bow light portion.

BRIEF DESCRIPTION OF THE DRAWINGS

FIG. 2 is a side view cutaway illustrating a boat hull depicting the horn mounted below the bow deck surface.

FIG. 3 is a front perspective view illustrating the device mounted to a bow deck surface.

FIG. 4 is a top perspective view illustrating one embodiment of the device affixed to a bow deck surface.

FIG. 5 is a top view illustrating the device mounted to a bow deck surface depicting the bow light illumination and horn sound directions.

DESCRIPTION OF THE PREFERRED EMBODIMENT

Figure 1:
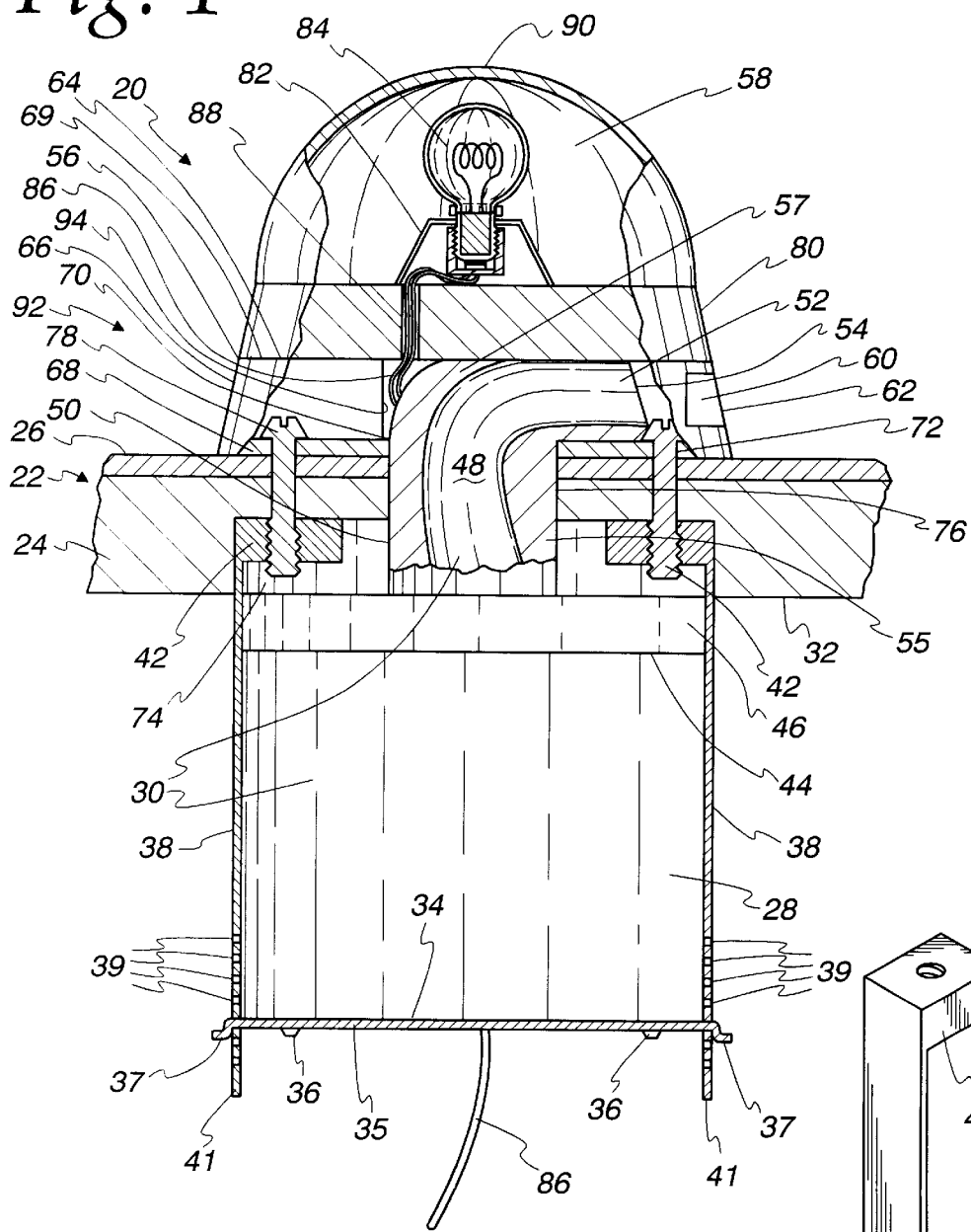
FIG. 1 is a side cross-sectional view illustrating a horn and bow light combination installed in a vertical position through a bow deck surface.

Turning to FIG. 1, a cross sectional view of a marine horn and bow light combination ("Device") 20 mounted in a boat deck 22 is depicted. Boat deck surface 22 is further comprised of deck subsurface 24 and deck upper surface 26.

The portion of Device 20 found below deck subsurface 24 comprises the horn 30 of horn assembly 28, the horn 30 being that part of horn assembly 28 that contains the mechanics of the horn. Various United States and International standards govern the size, decibels, operating Hertz range, octaves, etc., for horns. The present inventive device can be adapted to meet the various regulations based on boat location, size and other pertinent factors. As explained above, the general guidelines set forth by the American Boat and Yacht Council, Inc. are instructive. Recapping those guidelines: horns for vessels under 5 meters in length have no strict frequency requirements. However, a horn for these vessels should be capable of producing a continuous sound at the equivalent of 98 db at least 1 meter from the sound source for a period of 4 seconds at an ambient temperature of 77° F. plus or minus 10° F.

Horns for marine vessels from 5 meters in length in length up to 12 meters in length must be operable in a frequency of between 250 Hz and 1750 Hz. The horn should be capable of producing sound at the equivalent of 105 db at 1 meter from the sound source at an ambient temperature of 77° F. plus or minus 10° F. within an intermittent time cycle of 6 seconds on, 2 seconds off, 6 seconds off, 106 seconds off, for a period of 8 hours.

Horns for marine vessels from 12 meters to 20 meters in length must be operable in a frequency of 250 Hz and 700 Hz. The horn should be capable of producing sound at the equivalent of 120 db in at least one ⅓ octave band at 1 meter from the sound source, at an ambient temperature of 77° F. plus or minus 10° F. within an intermittent time cycle of 6 seconds on, 2 seconds off, 6 seconds off, 106 seconds off, for a period of 8 hours.

The guidelines further provide that those parts of the horn which are made of plastic and elastomeric materials used for functional enclosures and functional parts which are exposed to ultraviolet radiation and permanently installed must have a demonstrated ability to withstand the ultraviolet radiation expected to be encountered during its useful service life, without cracking, encountering distortion, or other degradation which results in horn failure. The horn must also be capable of being at least momentarily drenched without experiencing failure. Also, if the horn is to be used in a salt water environment, the materials of which the horn is made must be able to withstand a salt spray without experiencing failure.

The American Boat and Yacht Council, Inc. further requires that external parts of a horn have no sharp edges which may cause injury. Further, horns must be able to withstand the degree of vibration and shock to which they are normally subjected to in marine vessel applications without experiencing failure.

Horns must be capable of being stored in temperatures from −4° F. to 180° F. without permanent damage which results in the horn's ability to operate in a normal fashion. Horns must be capable of operating in a temperature range of 0° F. to 120° F. with no more than a 3 db reduction in the sound pressure level requirements of the particular horn.

When installing a horn, consideration must be given to mounting the horn so as to minimize damage by contact with other objects under normal operating conditions. Horns with directional properties should be mounted with their maximum sound pressure level directed toward the bow, and the sound shall not be acoustically obstructed by fixed vessel structure or gear.

Meeting the above requirements using the present art is difficult. Horns are generally mounted relatively high on the bow deck so as not to be obstructed by other mechanical devices, stationary features, or gear found on a boat deck. Also, due to the strict requirements for horn function, the present state of the art horns which are designed for external mounting are generally contained within a metal or heavy duty plastic housing. These housings are subject to exposure to the elements, and frequent repair or replacement.

The above described guidelines of The America Boat and Yacht Council, Inc. can be better met by using the present invention, Device 20, wherein the horn 30 of horn assembly 28 is mounted below the surface of boat deck 22. While any horn meeting the standards for use in a given marine vessel is acceptable, the inventors have found that a piezo ceramic audio device or siren work exceptionally well in the preferred embodiment of the Device.

Horn 28 is mounted to deck subsurface bottom 32. To mount horn 28, retaining cap 34 is affixed to horn bottom 35 via retaining cap nuts 36 which are threaded onto retaining cap bolts (not shown). Retaining cap 34 extends beyond the diameter of horn 28 and contains interlocking members 37 at each of its ends.

Figure 1A:
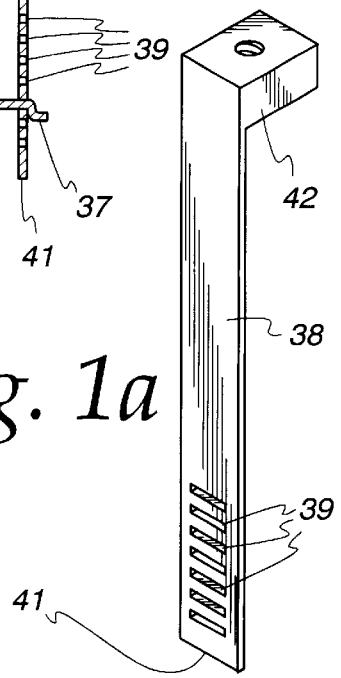
FIG. 1A is a side perspective view illustrating a mounting bracket.

Brackets 38 extend along the sidewalls 40 of horn 28 and terminate at their upper ends in nut 42. Turning to FIG. 1A, it can be seen that brackets 38 have slots 39 located near the bottom 41. Slots 39 interlock with interlocking members 37 of retaining cap 34. The plurality of slots insure that horn assembly 30 can be properly installed regardless of the thickness of bow deck 22 or depth of horn 28. At the top 44 of horn 28 is found cap 46. Removal of cap 46 exposes the inner workings of horn assembly 30. Extending vertically from cap 46 is horn resonating tube 48. Resonating tube 48 is a hollow member which is essentially cylindrical in shape, however, any geometric configuration may be used. The only requirement is that the sound emitted by resonating tube 48 is within the requirements established for horns for a particular marine vessel. Resonating tube 48 extends vertically through hole 50 in boat deck 22. After extending through hole 50, resonating tube 48 makes an essentially 90° turn at 52 to a horizontal position where it terminates in port 54. Resonating tube 48 is held in place by plug 55. Plug 55 is a hollow member which is inserted into hole 50. Plug 55 further contains guide 57 which directs the resonating tube to a horizontal position.

Figure 6:
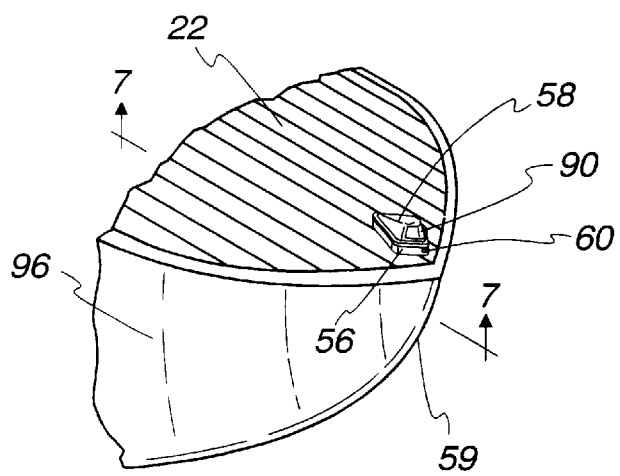
FIG. 6 is a top perspective view illustrating a second embodiment of the device mounted to a bow deck surface.

The above deck segment of resonating tube 48 is contained within housing 56. From a top perspective housing 56 is shaped to accept light unit 58 (FIGS. 4 and 6; more fully described below). The portion of housing 56 facing bow 59 contains mouth 60. Sound is transmitted from horn assembly 30 through mouth 60.

Mouth 60 is preferably rectangular in shape 61 (See FIG. 4), this configuration causes the sound emitting from mouth 60 to fan out to approximately 90°. However, any configuration that does not adversely affect the sound of the horn may be used. Mouth 60 is covered by a membrane material, preferably a thin Gortex® covering 62. The Gortex® covering prevents water and encountered debris from entering into horn assembly 30 yet does not significantly obstruct the sound emanating from horn assembly 30. Alternatively, the Gortex® covering may be placed over port 54. While Gortex® is preferred, any membrane material which protects the unit without unduly affecting the devices' function can be used.

Housing 56 has a top portion 64 which, as discussed above, is configured to accept light unit 58 (more fully discussed below). Housing 56 can accept an existing light assembly or a new light assembly. Housing 56 sidewalls 66 should be of sufficient height so that the resonating tube 48 of horn assembly 30 can make an unrestricted horizontal turn at 52 toward mouth 60 as guided by plug 55. Housing 56 further contains housing bottom 68. Housing bottom 68 includes resonating tube hole 70, through which plug 55 extends, and housing attachment holes 72.

To install horn assembly 30 and housing 56, bracket 38 is sized, using slots 39, to securely place horn assembly 30 against deck 22. Plug 55 is placed through hole 70. Resonating tube 48 is placed through plug 55. Housing attachment holes 72 are aligned with nuts 42 of bracket 38 and bolts 78 are placed into housing attachment holes 72, through deck surface 26, and threaded into nut 42.

Light unit 58 is then affixed to housing top 69 of housing 56. Light unit 58 must at least comprise a light source base 80 onto which is mounted light socket 82 which is adapted to accept light bulb 84. Electrical wires 86 pass through base unit transfer hole 88. Lens cover 90 must fit over the socket and light bulb and attach to light source base 80. Lens cover 90 can attach to light source base 80 through various means, including, by way of example only, a snapping mechanism, threaded mechanism, or being screwed into place. The only requirement is that lens cover 90 is removable from light source base 80 for replacement of light bulb 84. A standard bow light may also be used in conjunction with the horn assembly.

Lens cover 90 is generally a two-toned cap in which one-half of the cover is green and the other half of the cover is red. The lens cover should be positioned on the light source base so that the green half of the lens cover is facing the starboard side (right side) of the marine vessel, and the red portion of the lens cover is facing the port side (left side) of the marine vessel.

Light unit 58 is then affixed to housing top 64. The light unit may be affixed to the housing top through various means including, by way of example only, as a snapping mechanism, threaded mechanism, or by screwing it into place. Electrical wires 86 of light unit 58 travel through base unit transfer hole 86 and through housing unit transfer hole 94 through hole 50, and terminate near horn 28.

FIG. 2 depicts a cross-sectional view of hole 98 with device 20 being installed through deck 22. As is illustrated by FIG. 2, horn 28 is mounted on subsurface 24 with electrical wires 86 extending from horn bottom 35. Electrical wires 86 travel to the power source, such as a battery and switch for activating the horn assembly 30 and light unit 58. Resonating tube 48 is housed within plug 55 and extends through deck 22 into housing 56. Also visualized near bow 59 is mouth 60 of housing 56. It is through mouth 60 that sound from the resonating tube emits. As explained above, a water tight cover, such as Gortex®, is placed either over the port of the resonating tube or covers the housing mouth. While Gortex® is contemplated for use in the preferred embodiment, the only requirement of the covering material is that it is capable of keeping water and debris from entering the horn yet does not alter the sound emitting from the resonating tube outside the proscribed standards for a given marine vessel. Removably attached to the top of housing 56 is light unit 58.

FIGS. 3 and 4 depict a front view of device 20 mounted to boat deck 22 wherein mouth 60 can be clearly seen in housing 56. Illustrated in FIGS. 3 and 4 is lens 90 depicting the two-toned coloring wherein red is on the port side of the lens and green is on the starboard side of the lens.

FIG. 5 depicts the pathway of light 98 emanating from lens 90 and sound 100 emitting from horn assembly 30. Device 20 is configured in such a way to meet United States and International standards which require that sound emanate from the horn in a forward direction at least a 90° arc with the bow of the boat representing 45°. Device 20 is also configured such that the light emitting from light unit 58 is clearly visible on the port side and starboard side of a marine vessel.

FIG. 6 illustrates an alternate embodiment of the device wherein the housing 56 and light unit 58 are teardrop shaped. As noted above, the shape of the bow light and housing are not critical. The only requirement is that they both meet sound and light emitting requirements for a particular vessel and are complementary to one another.

Figure 7:
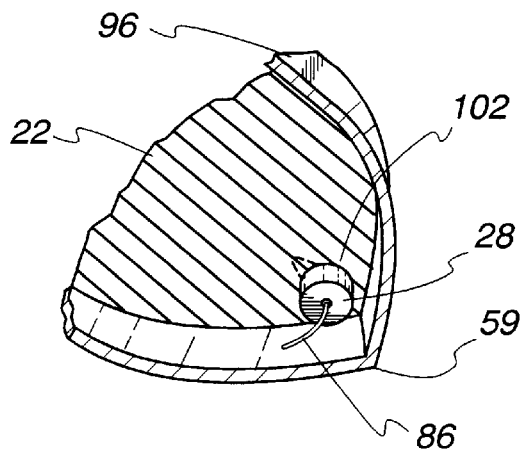
FIG. 7 is a cutaway side view illustrating a boat hull depicting the device mounted near the hull side wall.
Figure 8:
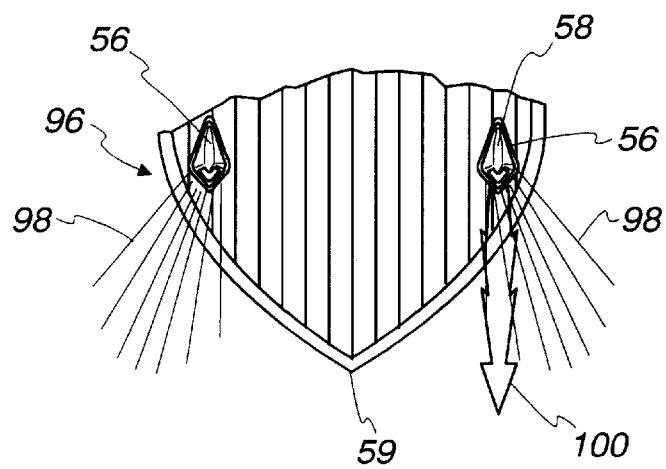
FIG. 8 is a top cutaway view illustrating a boat deck depicting two units mounted near the hull sidewalls and further depicting the light illumination and sound pathway from the two devices.

FIGS. 7 and 8 depict an alternate embodiment of the device wherein separate devices 20 are mounted into the sidewall 102 of boat hull 96. The configuration in this embodiment is identical to a bow mount with the exception that two devices are required, one for the port side and one for the starboard side, and that each individual device has a single colored lens cap. The port side lens cap will be red in color and the starboard side lens will be green in color.

Also contemplated is Device 20 being mounted totally above the bow deck or outside the hull. In this embodiment, horn assembly 30 will be externally mounted along with light unit 58. This embodiment may be useful when below deck or inside wall hull space is not sufficient to permit internal mounting of horn 28. This embodiment, while effective, does minimize or negate many of the benefits offered by internally mounting horn 28.

The above description of the preferred embodiment is for illustration purposes only. As those skilled in the arts will understand, there are many variations and modifications of the device that will retain the spirit of the invention. Therefore, the inventive device is to be limited only by the appended Claims.

What is claimed is:

1. A combination horn and light for marine use, the combination being installed on a boat bow, the bow having a deck portion further having a top side and a bottom side, comprising:

means for emitting sound further comprising a sound producing portion and a resonating tube, the sound producing portion being removably affixed to the bottom side of the deck, the resonating tube extending vertically from the sound producing portion through an opening in the deck, turning essentially to a horizontal position, and terminating in a port, the resonating tube portion found above the deck surface further being housed in a containment member, the containment member having an opening to emit sound and being an illumination source assembly mounting surface;

an illumination source assembly further comprising a base, an illumination source and a lens cover, the illumination source assembly further having a bottom portion to which the illumination source assembly removably affixes to the containment member at the illumination source mounting surface; and, means to supply power to the illumination source and means for emitting sound, connected to the illumination source and means for emitting sound.

2. The combination light and horn for marine use of claim 1 wherein the resonating tube of the horn is a hollow, essentially cylindrical member.

3. The combination light and horn for marine use of claim 1 wherein the opening to emit sound is essentially rectangular in shape.

4. The combination light and horn for marine use of claim 1 wherein the opening to emit sound is covered in a water tight material.

5. The combination light and horn for marine use of claim 1 wherein the port of the resonating tube is covered in a water tight material.

6. The combination light and horn for marine use of claim 5 wherein the water tight material is a membrane.

7. The combination light and horn for marine use of claim 5 wherein the water tight material does not significantly obstruct the sound emanating from the sound emitting means.

8. The combination light and horn for marine use of claim 1 further comprising a plug surrounding the resonating tube, the plug being a hollow member adapted to accept the resonating tube.

9. A combination light and horn for marine use, the combination being affixed to a boat hull, the boat hull further having an outer sidewall portion and an inner sidewall portion, comprising:

two means for producing sound, each means for producing sound further comprising a sound producing portion and a sound emitting portion, the sound emitting portion being removably affixed to the inner sidewall of the hull, the sound emitting portion extending from the sound producing portion at an angle perpendicular to the hull, through an opening in the hull, turning essentially to a horizontal position, near a mouth portion and terminating in a port, the sound emitting portion found outside the hull surface further being housed in a containment member having an opening to emit sound and an illumination source mounting surface;

two illumination assemblies, each illumination assembly further comprising a base, an illumination source, and a lens cover, the base further having a bottom portion adapted to affix to the illumination source mounting surface; and, power supply to operate both the means for producing sound and illumination sources.

10. The combination light and horn for marine use of claim 9 wherein the sound emitting portion of each horn is a hollow, essentially cylindrical member.

11. The combination light and horn for marine use of claim 9 wherein each opening to emit sound is essentially rectangular in shape.

12. The combination light and horn for marine use of claim 9 wherein the opening to emit sound is covered with a membrane.

13. The combination light and horn for marine use of claim 9 further comprising two plugs, each plug being identical in shape and further being a hollow member configured to secure each sound emitting portion in the opening in the hull and providing an unrestrictive guide to the sound emitting portion.

* * * * *